United States Patent
Linnenbrink et al.

(10) Patent No.: US 9,139,682 B2
(45) Date of Patent: Sep. 22, 2015

(54) FOAM CURABLE BY HEAT

(75) Inventors: Martin Linnenbrink, Apensen (DE); Jan Olaf Schulenburg, Uster (CH); Michael Gutgsell, Uster (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 12/689,941

(22) Filed: Jan. 19, 2010

(65) Prior Publication Data
US 2010/0183863 A1 Jul. 22, 2010

Related U.S. Application Data

(63) Continuation of application No. PCT/EP2008/059288, filed on Jul. 16, 2008.

(30) Foreign Application Priority Data

Jul. 16, 2007 (EP) .................................. 07112502

(51) Int. Cl.
*C08L 63/00* (2006.01)
*B32B 7/12* (2006.01)
*C08G 18/10* (2006.01)
*C09J 175/04* (2006.01)
*C08G 63/00* (2006.01)
*C08G 101/00* (2006.01)

(52) U.S. Cl.
CPC .............. *C08G 18/10* (2013.01); *C09J 175/04* (2013.01); *C08G 63/00* (2013.01); *C08G 2101/00* (2013.01); *Y10T 428/249921* (2015.04); *Y10T 428/249953* (2015.04); *Y10T 428/249984* (2015.04)

(58) Field of Classification Search
USPC ........................................ 428/317.5; 521/135
See application file for complete search history.

(56) References Cited

U.S. PATENT DOCUMENTS

| | | | |
|---|---|---|---|
| 3,821,130 A | 6/1974 | Barron et al. | |
| 3,849,156 A | 11/1974 | Marlin et al. | |
| 3,862,879 A | 1/1975 | Barron et al. | |
| 4,567,228 A * | 1/1986 | Gaa et al. | 524/588 |
| 4,582,873 A * | 4/1986 | Gaa et al. | 524/591 |
| 4,803,257 A * | 2/1989 | Goel | 528/45 |
| 5,234,757 A * | 8/1993 | Wong | 428/311.11 |

(Continued)

FOREIGN PATENT DOCUMENTS

| CN | 1717427 A | 1/2006 |
|---|---|---|
| DE | 10 2005 042 380 A1 | 3/2007 |

(Continued)

OTHER PUBLICATIONS

International Search Report of Application No. PCT/EP2008/059288 dated Nov. 6, 2008.

(Continued)

*Primary Examiner* — Megan McCulley
(74) *Attorney, Agent, or Firm* — Buchanan Ingersoll & Rooney PC

(57) ABSTRACT

A foam is disclosed that can be cured by heat having, for example, 10 to 80 vol. % of at least one gas and a compound that can be cured by heat. The foam can include at least one polyurethane polymer and at least one curing agent that can be activated by increased temperature. Foams that can be cured are suitable as flues, sealing compounds, or for the production of coatings, and can be cured by heat for structural adhesive bonds and for lining in vehicle construction.

34 Claims, 2 Drawing Sheets

(56) References Cited

U.S. PATENT DOCUMENTS

| | | | |
|---|---|---|---|
| 5,397,611 A * | 3/1995 | Wong | 428/35.7 |
| 5,540,963 A * | 7/1996 | Wong | 428/35.7 |
| 5,621,043 A * | 4/1997 | Croft | 525/111 |
| 5,660,901 A * | 8/1997 | Wong | 428/35.7 |
| 5,707,439 A | 1/1998 | Takekoshi et al. | |
| 5,783,272 A * | 7/1998 | Wong | 428/35.7 |
| 6,197,849 B1 | 3/2001 | Zilg et al. | |
| 6,271,276 B1 | 8/2001 | Gribble et al. | |
| 6,322,890 B1 | 11/2001 | Barron et al. | |
| 6,548,593 B2 | 4/2003 | Merz et al. | |
| 7,452,585 B1 * | 11/2008 | Wong et al. | 428/117 |
| 7,597,931 B2 | 10/2009 | Jones et al. | |
| 2002/0007003 A1 | 1/2002 | Merz et al. | |
| 2004/0147029 A1 | 7/2004 | Adam | |
| 2005/0282989 A1 | 12/2005 | Rosthauser | |
| 2006/0106168 A1 | 5/2006 | Ota et al. | |
| 2007/0051832 A1 | 3/2007 | Jones et al. | |
| 2007/0066721 A1 | 3/2007 | Kramer et al. | |
| 2007/0105983 A1 | 5/2007 | Kramer et al. | |
| 2007/0135607 A1 | 6/2007 | Rosthauser | |
| 2007/0191556 A1 | 8/2007 | Eger | |
| 2008/0306203 A1 | 12/2008 | Adam et al. | |

FOREIGN PATENT DOCUMENTS

| | | |
|---|---|---|
| EP | 1 306 372 | 2/1973 |
| EP | 1 152 019 A1 | 11/2001 |
| GB | 1 306 372 * | 2/1973 |
| JP | S51-40600 | 4/1976 |
| JP | S52-119697 | 10/1977 |
| JP | S53-008735 | 3/1978 |
| JP | 2002-533538 | 8/2002 |
| JP | 2004-250596 | 9/2004 |
| JP | 2007-527453 | 9/2007 |
| NL | 9000370 A | 9/1991 |
| WO | WO 00/39178 | 7/2000 |
| WO | WO 00/39178 A1 | 7/2000 |
| WO | WO 02/083776 A1 | 10/2002 |
| WO | WO 2004/055092 A1 | 7/2004 |
| WO | WO 2004/081076 A1 | 9/2004 |
| WO | WO 2005/007720 A1 | 1/2005 |

OTHER PUBLICATIONS

Written Opinion of the International Searching Authority of Application No. PCT/EP2008/059288 dated Nov. 6, 2008.

Wicks, Douglas, et al., "Blocked isocyanates III: Part A. Mechanisms and chemistry," *Progress in Organic Coatings*, 1999, pp. 148-172, vol. 36, Elsevier Science S.A.

Wicks, Douglas, et al., "Blocked isocyanates III Part B: Uses and applications of blocked isocyanates," *Progress in Organic Coatings*, 2001, pp. 1-83, vol. 41, Elsevier Science B.V.

Notice of Reasons for Rejection issued on Aug. 27, 2013, in corresponding Japanese Patent Application No. 2010-516498 and an English translation thereof.

Notification of Fourth Office Action issued on Sep. 17, 2013, in corresponding Chinese Patent Application No. 2008-80024881.3, and an English translation thereof.

\* cited by examiner

FOAM CURABLE BY HEAT

RELATED APPLICATIONS

This application claims priority as a continuation application under 35 U.S.C. §120 to PCT/EP2008/059288, which was filed as an International Application on Jul. 16, 2008 designating the U.S., and which claims priority to European Application 07112502.5 filed in Europe on Jul. 16, 2007. The entire contents of these applications are hereby incorporated by reference in their entireties.

FIELD

The disclosure relates to the field of heat curing foams, such as those used as adhesives, sealants or for producing coatings.

BACKGROUND INFORMATION

Heat curing epoxy resin compositions containing a reaction product of a polyurethane polymer terminated by isocyanate groups with a monohydroxy epoxide as impact modifier are known and are described, for example, in WO 2004/0055092 A1 and in WO 2005/007720 A1. Such heat curing epoxy resin compositions can be suitable as structural adhesives for applications having very demanding requirements in terms of the mechanical properties.

For reasons of reducing materials consumption, associated cost savings, for reducing weight, and/or for changing properties of a composition or for filling hollow spaces for acoustic insulation or reinforcement, compositions used as adhesives or sealants have been foamed for a long time. For the same reasons, foam heat curing epoxy resin compositions have been used.

Such heat curing epoxy resin compositions can be highly viscous and have hitherto been foamed using chemical or physical blowing agents which develop their action after application and before or during curing of the composition under the action of heat. These foaming processes involve precise application of the foam which is virtually impossible. The increasing volume of the heat curing composition and the direction in which the foam expands when it is produced by chemical or physical blowing agents after application cannot be predicted very accurately. The expanding foam can, for example, push the substrates to be adhesively bonded against one another or swell out from joints to be sealed, so that unsatisfactory end products are formed. Since the expansion of the composition by chemical or physical blowing agents involves an increase in temperature, curing of the heat curing foam can occur simultaneously with foaming. This can result in the heat curing epoxy resin composition being cured before it is completely foamed, which can be undesirable when, for example, the foam is to be used as sealant for joints and the joint is not completely filled due to unsatisfactory foaming. Also, when, for example, adhesively bonding two substrates, corrections such as moving the substrates which have already been joined may no longer be possible after foaming because curing of the epoxy resin composition has commenced during the foaming process. For the same reason, processes such as, for example, "stripping" (i.e., smoothing of sealed joints after foaming) can be impossible or at least more difficult.

In addition, the degree of foaming can be difficult to set and cannot be checked before application.

SUMMARY

A heat curing foam is disclosed, comprising: a) from 10 to 80% by volume of at least one gas; and b) a heat curing composition Z containing: b1) at least one polyurethane polymer of formula (I):

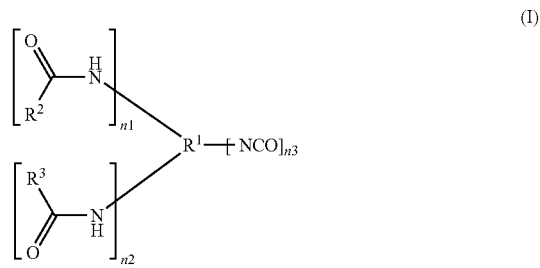

where $R^1$ is a polyurethane polymer PU1 terminated by n1+n2+n3 isocyanate groups after removal of all terminal isocyanate groups; each radical $R^2$, independently of other $R^2$ radicals, is at least one of a blocking group which is eliminated at a temperature above 100° C., and a group of formula (II):

each radical $R^3$, independently of other $R^3$ radicals, is at least one of a blocking group which is eliminated at a temperature above 100° C., and a group of formula (II'):

where each $R^4$ and $R^{4'}$ are at least one of an aliphatic, a cycloaliphatic, an aromatic, and an arylaliphatic (p+1), respectively f+1)-valent hydrocarbon radical, where: p=1, 2 or 3 and f=1, 2 or 3; n1, n2 and n3 are each in a range from 0 to 7, with 2≤(n1+n2+n3)≤8; and b2) at least one hardener B which is activated by elevated temperature.

A process for producing a heat curing foam is disclosed, comprising: forming a heat curing composition containing: a) from 10 to 80% by volume of at least one gas; and b) a heat curing composition Z containing: b1) at least one polyurethane polymer of formula (I):

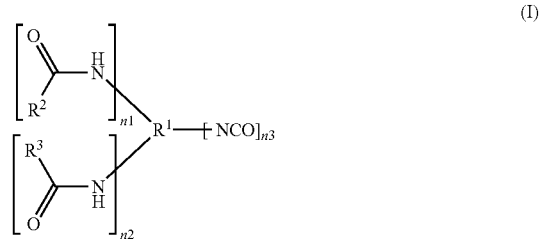

where $R^1$ is a polyurethane polymer PU1 terminated by n1+n2+n3 isocyanate groups after removal of all terminal isocyanate groups; each radical $R^2$, independently of other $R^2$ radicals, is at least one of a blocking group which is eliminated at a temperature above 100° C., and a group of formula (II):

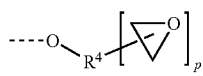

each radical $R^3$, independently of other $R^3$ radicals, is at least one of a blocking group which is eliminated at a temperature above 100° C., and a group of formula (II'):

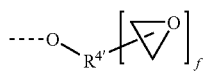

where each $R^4$ and $R^{4'}$ are at least one of an aliphatic, a cycloaliphatic, an aromatic, and an arylaliphatic (p+1), respectively (f+1)-valent hydrocarbon radical, where: p=1, 2 or 3 and f=1, 2 or 3; n1, n2 and n3 are each in a range from 0 to 7, with 2≤(n1+n2+n3)≤8; and b2) at least one hardener B which is activated by elevated temperature; introducing gas into the heat curing composition at least at atmospheric pressure; and distributing the gas in the composition by a mixing apparatus.

A heat cured foam obtained from a heat curing foam is disclosed, comprising: a) from 10 to 80% by volume of at least one gas; and b) a heat curing composition Z containing: b1) at least one polyurethane polymer of formula (I):

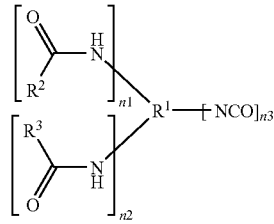

where $R^1$ is a polyurethane polymer PU1 terminated by n1+n2+n3 isocyanate groups after removal of all terminal isocyanate groups; each radical $R^2$, independently of other $R^2$ radicals, is at least one of a blocking group which is eliminated at a temperature above 100° C., and a group of formula (II):

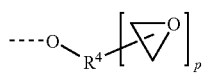

each radical $R^3$, independently of other $R^3$ radicals, is at least one of a blocking group which is eliminated at a temperature above 100° C., and a group of formula (II'):

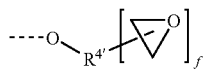

where each $R^4$ and $R^{4'}$ are at least one of an aliphatic, a cycloaliphatic, an aromatic, and an arylaliphatic (p+1), respectively (f+1)-valent hydrocarbon radical, where: p=1, 2 or 3 and f=1, 2 or 3; n1, n2 and n3 are each in a range from 0 to 7, with 2≤(n1+n2+n3)≤8; and b2) at least one hardener B which is activated by elevated temperature.

An article is disclosed which has been at least one of adhesively bonded, sealed, filled with foam and coated by a process, comprising: forming a heat curing composition containing: a) from 10 to 80% by volume of at least one gas; and b) a heat curing composition Z containing: b1) at least one polyurethane polymer of formula (I):

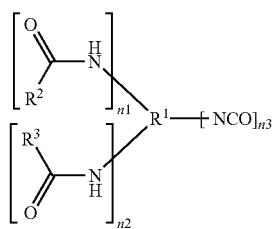

where $R^1$ is a polyurethane polymer PU1 terminated by n1+n2+n3 isocyanate groups after removal of all terminal isocyanate groups; each radical $R^2$, independently of other $R^2$ radicals, is at least one of a blocking group which is eliminated at a temperature above 100° C., and a group of formula (II):

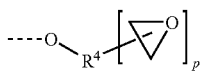

each radical $R^3$, independently of other $R^3$ radicals, is at least one of a blocking group which is eliminated at a temperature above 100° C., and a group of formula (II'):

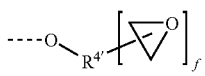

where each $R^4$ and $R^{4'}$ are at least one of an aliphatic, an cycloaliphatic, a aromatic, and an arylaliphatic (p+1), respectively (f+1)-valent hydrocarbon radical, where: p=1, 2 or 3 and f=1, 2 or 3; n1, n2 and n3 are each in a range from 0 to 7, with 2 (n1+n2+n3)$_8$; and b2) at least one hardener B which is activated by elevated temperature; introducing gas into the heat curing composition at least at atmospheric pressure; and distributing the gas in the composition by a mixing apparatus.

BRIEF DESCRIPTION OF THE DRAWINGS

Other features and advantages of exemplary embodiments of the disclosure are described below with respect to exemplary embodiments, and the aid of the drawings. Elements which are identical or have the same effect are provided with the same reference numerals in the various figures. Of course, the disclosure is not restricted to illustrative embodiments shown and described.

In the Figures.

Figure 1:
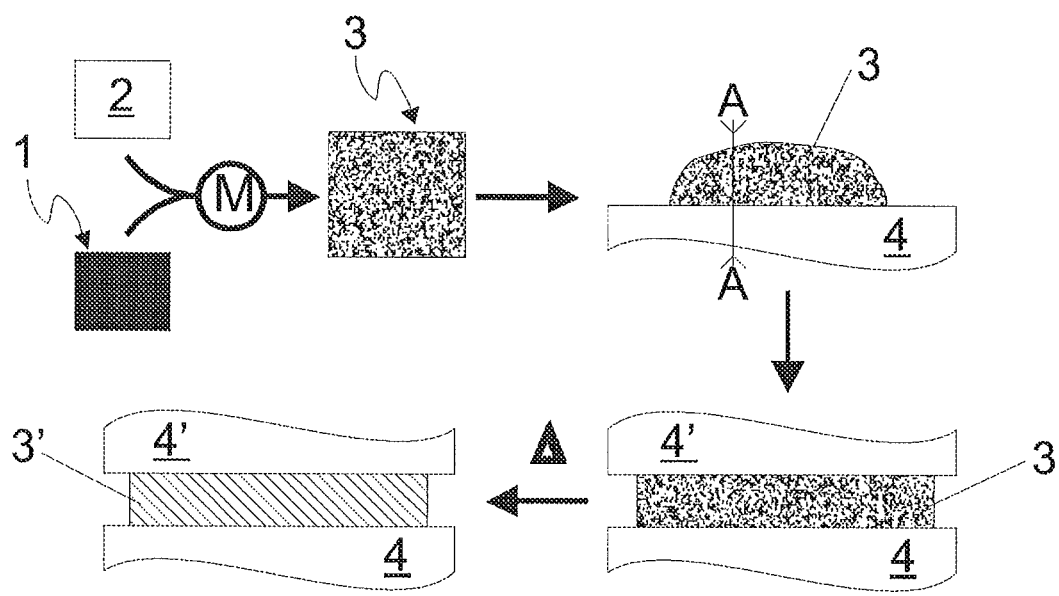
FIG. 1 schematically shows an exemplary process for producing, applying and curing an exemplary heat curing foam according to the disclosure.

In the Figures, those elements essential for the direct understanding of the disclosure are shown.

DETAILED DESCRIPTION

A heat curing foam is disclosed which can be applied precisely. It has surprisingly been found that a heat curing foam which is in foamed form before application can, for example, be suitable as adhesive, sealant, for producing coatings or for other products readily apparent to those skilled in the art.

Exemplary embodiments and methods as disclosed herein expand the field of application of heat curing epoxy resin compositions, as well as their use over a large area both inexpensively and with a weight saving. Exemplary heat curing foams as disclosed herein can be applied very precisely and substantially retain their shape and structure during the curing process. As a result, it is possible to produce highly precise adhesive bonds or sealed joints using heat curing foams having epoxy resin compositions. In addition, the degree of foaming of the heat curing foam can be set very precisely and foams having a very high proportion of gas can also be produced. The precise setting of the degree of foaming makes it possible to produce foams which can have different properties and can be used for different purposes from identical heat curing compositions.

A suitable exemplary process for production and the immediate subsequent application of heat curing foams as disclosed herein makes it possible to alter the gas content in the foam during application. This can avoid using a plurality of plants for mechanical application by means of application robots and the application can be carried out in one piece (e.g., without setting down an application instrument).

Exemplary Methods of the Disclosure

An exemplary heat curing foam as disclosed herein can include from 10 to 80% by volume of at least one gas and a heat curing composition Z containing at least one polyurethane polymer of the formula (I) and also at least one hardener B which is activated by elevated temperature.

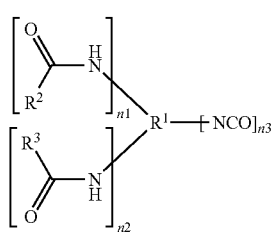

As referenced herein, the term "foam" refers, for example, to a structure composed of gas-filled, spherical or polyhedral cells which are bounded by liquid, semiliquid, highly viscous or solid cell walls.

As referenced herein, names of substances commencing with "poly" (e.g. polyol or polyisocyanate), refer, for example, to substances which formally contain two or more of the named functional groups per molecule.

As referenced herein, the term "polymer" encompasses, for example, a collection of macromolecules which are chemically uniform but differ in terms of degree of polymerization, molar mass and chain length, which have been produced by a polyreaction (polymerization, polyaddition, polycondensation). The term also encompasses derivatives of such a collection of macromolecules from polyreactions (e.g., compounds which have been obtained by reactions, for example additions or substitutions, of functional groups on predetermined macromolecules and can be chemically uniform or chemically nonuniform). The term also encompasses prepolymers (e.g., reactive oligomeric preadducts whose functional groups participate in formation of macromolecules).

The term "polyurethane polymer" encompasses, for example, polymers which are produced by the diisocyanate polyaddition process. This also includes polymers which are virtually or completely free of urethane groups. Examples of polyurethane polymers are polyether polyurethanes, polyester polyurethanes, polyether polyureas, polyureas, polyester polyureas, polyisocyanurates and polycarbodiimides.

In the polyurethane polymer of the formula (I), $R^1$ can be a linear or branched polyurethane polymer PU1 which is terminated by n1+n2+n3 isocyanate groups after removal of all terminal isocyanate groups.

The radical or radicals $R^2$ can each be, independently of one another, a blocking group which is eliminated at a temperature above 100° C. or a group of the formula (II).

The radical or radicals $R^3$ can each be, independently of one another, a blocking group which is eliminated at a temperature above 100° C. or a group of the formula (II').

Here, the radicals $R^4$ and $R^{4'}$ are each an aliphatic, cycloaliphatic, aromatic or arylaliphatic (p+1)- or (f+1)-valent hydrocarbon radical which may contain heteroatoms.

p and f can each be, for example, independently of one another, 1, 2 or 3.

n1, n2 and n3 can each be, for example, independently of one another, in the range, for example, from 0 to 7 (or greater), with the exemplary proviso that 2≤(n1+n2+n3)≤8.

There is in principle a very wide variety of possible blocking groups $R^2$ and $R^3$ and a person skilled in the art will recognize a large number of such blocking groups, for example from the articles by Douglas A. Wick in *Progress in Organic Coatings* 36 (1999), 148-172, and in *Progress in Organic Coatings* 41 (2001), 1-83.

Radicals $R^2$ and/or $R^3$ can, for example, be radicals selected from the group comprising (e.g., consisting of):

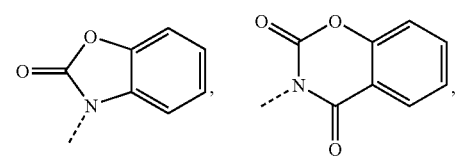

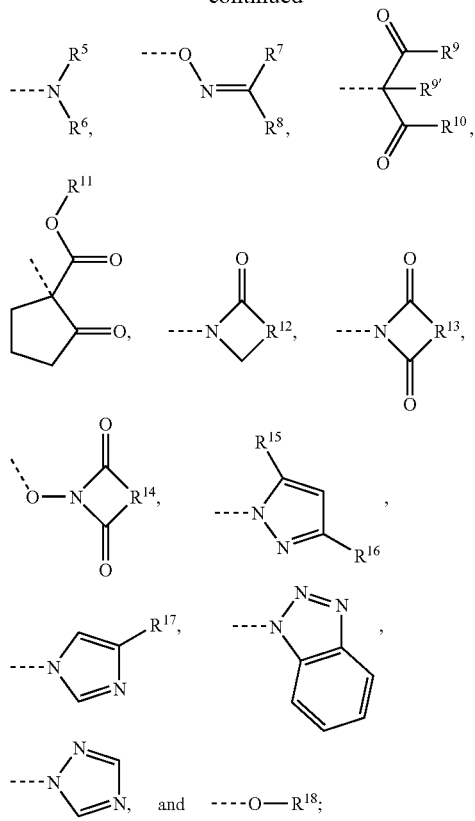

Here, $R^5$, $R^6$, $R^7$ and $R^8$ can each be, for example, independently of one another, an alkyl or cycloalkyl or aryl or arylalkyl or alkylaryl group. It is likewise possible for $R^5$ together with $R^6$ or $R^7$ together with $R^8$ to form part of a 4- to 7-membered ring which may be substituted.

$R^9$, $R^{9'}$ and $R^{10}$ can each be, for example, independently of one another, an alkyl or aryl or arylalkyl or alkylaryl group or an alkoxy or aryloxy or arylalkyloxy group and $R^{11}$ is an alkyl group.

Furthermore, $R^{12}$, $R^{13}$ and $R^{14}$ are each, independently of one another, an alkylene group having from 2 to 5 carbon atoms which may have double bonds or be substituted, or a phenylene group or a hydrogenated phenylene group.

$R^{15}$, $R^{16}$ and $R^{17}$ are each, independently of one another, H or an alkyl or aryl or arylalkyl group and $R^{18}$ is an arylalkyl group or a monocyclic or polycyclic substituted or unsubstituted aromatic group which may bear aromatic hydroxyl groups.

It will be readily apparent to those skilled in the art that all of the abovementioned substituents should not contain, for example, any hydroxyl groups, primary or secondary amino groups, mercapto groups, urea groups or other groups having active hydrogen when the polyurethane polymer of the formula (I) has free isocyanate groups (e.g., when n3≠0 in the polyurethane polymer of the formula (I)).

The hardener B can be activated by an elevated temperature. It is, for example, a hardener selected from the group consisting of dicyandiamide, guanamines, guanidines, aminoguanidines and derivatives thereof. Furthermore, hardeners having an accelerating action can be used (e.g., substituted ureas such as 3-(3-chloro-4-methylphenyl)-1,1-dimethylurea (chlortoluron), or phenyldimethylureas, such as p-chlorophenyl-N,N-dimethylurea (monuron), 3-phenyl-1,1-dimethylurea (fenuron), or 3,4-dichlorophenyl-N,N-dimethylurea (diuron)). Furthermore compounds of the class of imidazoles and amine complexes can be used.

Hardener B is, for example, selected from the group (e.g., consisting of) dycandiamide, guanimines, guanidines, aminoguanidines and derivatives thereof; substituted ureas for example 3-(3-chloro-4-methylphenyl)-1,1-dimethylurea (chlortoluron), or phenyldimethylureas, such as p-chlorophenyl-N,N-dimethylurea (monuron), 3-phenyl-1,1-dimethylurea (fenuron), 3,4-dichlorophenyl-N,N-dimethylurea (diuron), and also imidazoles and amine complexes.

An exemplary suitable hardener B is dicyandiamide. If the polyurethane polymer of the formula (I) has both epoxy and isocyanate groups, the hardener B can be an imidoamine, for example an imide of a polyalkylenepolyamine, such as a monoimide of a polyalkylenepolyamine.

If n3≥2 in the polyurethane of the formula (I) and accordingly 2 n3≤8, the hardener B can be a hardener for isocyanates. The blocking of such a hardener B can be chemical or physical in nature. Examples of suitable chemically blocked hardeners are polyamines bound to metals via a complexing bond, such as complexes of methylenedianiline (MDA) and sodium chloride. Such complexes can be usually described by the overall formula $(MDA)_3 \cdot NaCl$. A suitable type can be obtained as a dispersion in diethylhexyl phthalate under the trade name Caytur® 21 from Chemtura Corp., USA. The complex decomposes on heating, for example, to from 80 to 160° C. at a rate which increases with increasing temperature, liberating methylenedianiline as active hardener. Examples of physically blocked hardeners are microencapsulated hardeners. Substances which are suitable for use as hardeners in microencapsulated form are dihydric or polyhydric alcohols such as 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, hydrogenated bisphenol A, dimeric fatty alcohols, 1,1,1-trimethylolethane, 1,1,1-trimethylolpropane, glycerol, pentaerythritol, sugar alcohols, low molecular weight alkoxylation products of the abovementioned dihydric and polyhydric alcohols; short-chain polyester polyols such as bisglycol esters of terephthalic acid; aliphatic, cycloaliphatic and aromatic amino alcohols such as ethanolamine, propanolamine, butanolamine, N-methylethanolamine, diethanolamine, triethanolamine; hydrazides of dicarboxylic acid; aliphatic polyamines such as ethylenediamine, 1,2- and 1,3-propanediamine, 2-methyl-1,2-propanediamine, 2,2-dimethyl-1,3-propanediamine, 1,3- and 1,4-butanediamine, 1,3- and 1,5-pentanediamine, 1,6-hexamethylenediamine, 2,2,4- and 2,4,4-trimethylhexamethylenediamine and mixtures thereof, 1,7-heptanediamine, 1,8-octanediamine, 4-aminomethyl-1,8-octanediamine, 1,9-nonanediamine, 1,10-decanediamine, 1,11-undecanediamine, 1,12-dodecanediamine, methylbis(3-aminopropyl)amine, 1,5-diamino-2-methylpentane (MPMD), 1,3-diaminopentane (DAMP), 2,5-dimethyl-1,6-hexamethylenediamine, dimeric fatty acid diamines; cycloaliphatic polyamines such as 1,2-, 1,3- and 1,4-diaminocyclohexane, bis(4-aminocyclohexyl)methane, bis(4-amino-3-methylcyclohexyl)methane, bis(4-amino-3-ethylcyclohexyl)methane, bis(4-amino-3,5-dimethylcyclohexyl) methane, 1-amino-3-aminomethyl-3,5,5-trimethylcyclohexane (=isophoronediamine or IPDA), 2- and 4-methyl-1,3-diaminocylcohexane and mixtures thereof, 1,3- and 1,4-bis(aminomethyl)cyclohexane, 1-cyclohexylamino-3-aminopropane, 2,5(2,6)-bis(aminomethyl)bicyclo[2.2.1]

heptane (NBDA, produced by Mitsui Chemicals, Japan), 3(4),8(9)-bis(aminomethyl)-tricyclo[5.2.1.0$^{2,6}$]decane, 1,4-diamino-2,2,6-trimethylcyclohexane (TMCDA), 3,9-bis(3-aminopropyl)-2,4,8,10-tetraoxaspiro[5.5]undecane, 1,3- and 1,4-xylylenediamine; aliphatic polyamines containing ether groups, e.g. bis(2-aminoethyl)ether, 4,7-dioxadecane-1,10-diamine, 4,9-dioxadodecane-1,12-diamine and higher oligomers thereof, polyoxyalkylenepolyamines having two or three amino groups, which can be obtained, for example, under the name Jeffamine® (produced by Huntsman International, LLC, USA); aromatic polyamines such as methylenedianiline, bis(aminophenyl)ether, bis(aminophenyl) sulfone, the isomeric phenylenediamines, aminodiphenylamine. For example, the aliphatic, cycloaliphatic and aromatic polyamines mentioned can be used. The microencapsulation of these hardeners can be carried out by a customary method, for example by means for spray drying, interfacial polymerization, coacervation, dipping or centrifuge processes, fluidized-bed processes, vacuum encapsulation or electrostatic microencapsulation. The microcapsules obtained in this way have, for example, a particle size of from 0.1 to 100 μm, for example from 0.3 to 50 μm. The size of the microcapsules should be such that for example, firstly, they open effectively on heating and, secondly, optimal homogeneity and thus cohesive strength of the foam is obtained after curing. Furthermore, they should not have any adverse effect on the adhesion properties of the foam. Exemplary materials for the capsule shell are polymers which are insoluble in the hardener to be encapsulated and have a melting point of from 40 to 200° C. Examples of suitable polymers are hydrocarbon waxes, polyethylene waxes, wax esters, polyesters, polyamides, polyacrylates, polymethacrylates or mixtures of a plurality of such polymers.

The proportion of the hardener B can, for example, be from 0.05 to 8% by weight, such as from 0.1 to 6% by weight, more preferably from 0.2 to 5% by weight, based on the total weight of the foam.

As referenced herein, the term "hardener" includes catalysts and catalytically active compounds. It will in this case be clear to those skilled in the art that when a catalyst or a catalytically active compound is used as hardener B, the proportion of the hardener B in the total foam can be in the lower region of the range indicated. Accordingly, this proportion will be in the upper part of the range (e.g., from 0.5 to 8% by weight, such as from 1 to 6% by weight, preferably from 2.5 to 5% by weight), when the hardener B is a hardener which is consumed in a stoichiometric ratio to the reactive groups of the polyurethane polymer of the formula (I), while in the case of a catalyst the proportion will be lower (e.g., from 0.05 to 2% by weight, such as from 0.1 to 1% by weight, preferably from 0.2 to 0.75% by weight), in each case based on the total weight of the foam.

The polyurethane polymer PU1 on which $R^1$ is based can be prepared from at least one polyisocyanate and at least one polymer $Q_{PM}$ having terminal amino, thiol or hydroxyl groups and/or an optionally substituted polyphenol $Q_{PP}$.

Suitable polyisocyanates are, for example, diisocyanates and triisocyanates.

Suitable exemplary diisocyanates are aliphatic, cycloaliphatic, aromatic or arylaliphatic diisocyanates, such as commercial products such as methylenedi(phenyl isocyanate) (MDI), hexamethylene diisocyanate (HDI), tolylene diisocyanate (TDI), tolidine diisocyanate (TODI), isophorone diisocyanate (IPDI), trimethylhexamethylene diisocyanate (TMDI), 2,5- or 2,6-bis(isocyanatomethyl)bicyclo[2.2.1]heptane, 1,5-naphthalene diisocyanate (NDI), dicyclohexylmethyl diisocyanate ($H_{12}$MDI), p-phenylene diisocyanate (PPDI), m-tetramethylxylylene diisocyanate (TMXDI), etc., and also dimers thereof. Preference, according to exemplary embodiments, can be given to HDI, IPDI, MIDI or TDI.

Suitable triisocyanates are trimers, allophanates or biurets of aliphatic, cycloaliphatic, aromatic or arylaliphatic diisocyanates, such as the isocyanurates and biurets of the diisocyanates described in the preceding paragraph.

Of course, it is also possible to use mixtures of diisocyanates or triisocyanates.

Particularly suitable exemplary polymers $Q_{PM}$ having terminal amino, thiol or hydroxyl groups are polymers $Q_{PM}$ having two or three terminal amino, thiol or hydroxyl groups.

The polymers $Q_{PM}$ have an equivalent weight of 300 to 6000, such as from 600 to 4000, preferably from 700 to 2200, g/equivalent of NCO-reactive groups.

Suitable exemplary polymers $Q_{PM}$ are polyols, for example the following commercial polyols or any mixtures thereof:

polyoxyalkylene polyols, also referred to as polyether polyols, which are the polymerization product of ethylene oxide, 1,2-propylene oxide, 1,2- or 2,3-butylene oxide, tetrahydrofuran or mixtures thereof, if appropriate polymerized with the aid of a starter molecule having two or three active H atoms, for example water or compounds having two or three OH groups. The polyoxyalkylene diols can have different degrees of unsaturation (measured in accordance with ASTM D-2849-69 and reported in milliequivalents of unsaturation per gram of polyol (meq/g)). Those having a low degree of unsaturation are prepared, for example, with the aid of double metal cyanide catalysts (DMC catalysts), and those having a higher degree of unsaturation are prepared, for example, with the aid of anionic catalysts such as NaOH, KOH, CsOH or alkali metal alkoxides.

Particularly suitable exemplary polyoxyalkylene polyols are polyoxyalkylene diols or polyoxyalkylene triols having a degree of unsaturation of less than 0.02 meq/g and a molecular weight in a range from, for example, 1000 to 30 000 g/mol, and also polyoxyethylene diols, polyoxyethylene triols, polyoxypropylene diols and polyoxypropylene triols having a molecular weight of from, for example, 400 to 8000 g/mol. In the present document, the "molecular weight" is the number average molecular weight Mn.

Polyoxyalkylene polyols which are likewise particularly suitable are ethylene oxide-terminated ("EO end-capped", ethylene oxide end-capped) polyoxypropylene polyols. The latter are specific polyoxypropylene-polyoxyethylene polyols which are obtained, for example, by a process in which pure polyoxypropylene polyols, such as polyoxypropylene diols and triols are, after conclusion of the polypropoxylation reaction, alkoxylated further by ethylene oxide and as a result have primary hydroxyl groups.

Styrene-acrylonitrile- or acrylonitrile-methylmethacrylate-grafted polyether polyols.

Polyester polyols, also referred to as oligoesterols, prepared, for example, from dihydric to trihydric alcohols such as 1,2-ethanediol, diethylene glycol, 1,2-propanediol, dipropylene glycol, 1,4-butanediol, 1,5-pentanediol, 1,6-hexanediol, neopentyl glycol, glycerol, 1,1,1-trimethylolpropane or mixtures of the abovementioned alcohols by reaction with organic dicarboxylic acid or anhydrides or esters thereof, for example succinic acid, glutaric acid, adipic acid, suberic acid, azelaic acid, sebacic acid, dodecanedicarboxylic acid, maleic acid, fumaric acid, phthalic acid, isophthalic acid, terephthalic acid and hexahydrophthalic acid or mixtures of the abovementioned acids, and also polyester polyols derived from lactones such as ε-caprolactone.

Polycarbonate polyols which can be obtained by reacting, for example, the abovementioned alcohols used for forming the polyester polyols with dialkyl carbonates, diaryl carbonates or phosgene.

Polyacrylate polyols and polymethacrylates polyols.

Polyhydrocarbon polyols, also referred to as oligohydrocarbonols, for example polyhydroxy-functional ethylene-propylene, ethylene-butylene or ethylene-propylene-diene copolymers, as are produced, for example, by Kraton Polymers, or polyhydroxy-functional copolymers derived from dienes such as 1,3-butadiene or diene mixtures and vinyl monomers such as styrene, acrylonitrile or isobutylene, or polyhydroxy-functional polybutadiene polyols, for example those which are prepared by copolymerization of 1,3-butadiene and allyl alcohol and can also be hydrogenated.

Polyhydroxy-functional acrylonitrile-butadiene copolymers as can be prepared, for example, from epoxides or amino alcohols and carboxyl-terminated acrylonitrile-butadiene copolymers (commercially available under the name Hycar® CTBN from Emerald Performance Materials, LLC, USA).

The polymers $Q_{PM}$ are advantageously bifunctional or higher-functional polyols having OH equivalent weights of from, for example, 300 to 6000 g/OH equivalent, such as from 600 to 4000 g/OH equivalent, preferably from 700 to 2200 g/OH equivalent. Furthermore, the polyols can be selected from the group comprising (e.g., consisting of) polyethylene glycols, polypropylene glycols, polyethylene glycol-polypropylene glycol block copolymers, polybutylene glycols, hydroxyl-terminated polybutadienes, hydroxyl-terminated butadiene-acrylonitrile copolymers, hydroxyl-terminated synthetic rubbers, hydrogenation products thereof and mixtures of these polyols.

Furthermore, it is also possible to use bifunctional or higher-functional amino-terminated polyethylene ethers, polypropylene ethers as are commercially available, for example, under the name Jeffamine® from Huntsman International, LLC, USA, polybutylene ethers, polybutadienes, butadiene-acrylonitrile copolymers as are, for example, commercially available under the name Hycar® ATBN from Emerald Performance Materials, LLC, USA, and also further amino-terminated synthetic rubbers or mixtures of the components mentioned as polymers $Q_{PM}$.

It is also possible for the polymers $Q_{PM}$ to be chain-extended, as can be carried out in a manner known to those skilled in the art by reaction of polyamines, polyols and polyisocyanates, in particular diamines, diols and diisocyanates.

It can be advantageous to, for example, ensure that the polyurethane polymers PU1 and the chain-extended polyurethane polymers do not have excessively high viscosities, such as when higher-functional compounds are used for chain extension, since this can make their conversion into the polymers of the formula (I) or the application of the composition more difficult.

As polymers $Q_{PM}$, preference can be given to polyols having molecular weights in the range from, for example, 600 to 6000 g/mol selected from the group comprising (e.g., consisting of) polyethylene glycols, polypropylene glycols, polyethylene glycols, polypropylene glycol block polymers, polybutylene glycols, hydroxyl-terminated polybutadienes, hydroxyl-terminated butadiene-acrylonitrile copolymers and mixtures thereof.

For example, exemplary preferred polymers $Q_{PM}$ are α,ω-dihydroxypolyalkylene glycols which have $C_2$-$C_6$-alkylene groups or mixed $C_2$-$C_6$-alkylene groups and are terminated by amino, thiol or preferably hydroxyl groups. Preference can, for example, be given to polypropylene glycols or polybutylene glycols. More preferred are, for example, hydroxyl-terminated polyoxybutylenes.

Suitable polyphenols $Q_{PP}$ include, for example, bisphenols, trisphenols and tetraphenols. Not only pure phenols but also, if appropriate, substituted phenols are encompassed here. The type of substitution can vary widely. In particular, the substitution can be directly on the aromatic ring to which the phenolic OH group is bound. Furthermore, the term phenols refers not only to monocyclic aromatics but also to polycyclic or fused aromatics or heteroaromatics which have the phenolic OH group directly on the aromatic or heteroaromatic. The type and position of such a substituent can influence, inter alia, the reaction with isocyanates which can be desired for formation of the polyurethane polymer PU1.

The bisphenols and trisphenols are, for example, suitable. Suitable bisphenols or trisphenols are, for example, 1,4-dihydroxybenzene, 1,3-dihydroxybenzene, 1,2-dihydroxybenzene, 1,3-dihydroxytoluene, 3,5-di-hydroxybenzoates, 2,2-bis(4-hydroxyphenyl)propane (=bisphenol A), bis(4-hydroxyphenyl)methane (=bisphenol F), bis(4-hydroxyphenyl) sulfone (=bisphenol S), naphthoresorcinol, dihydroxynaphthalene, dihydroxyanthraquinone, dihydroxybiphenyl, 3,3-bis(p-hydroxyphenyl)phthalides, 5,5-bis (4-hydroxy-phenyl)hexahydro-4,7-methanoindane, phenolphthalein, fluorescein, 4,4'-[bis(hydroxyphenyl)-1,3-phenylenebis(1-methylethylidene)] (=bisphenol M), 4,4'-[bis(hydroxyphenyl]-1,4-phenylenebis(1-methylethylidene)] (=bisphenol P), 2,2'-diallylbisphenol A, diphenols and dicresols prepared by reacting phenols or cresols with diisopropylidenebenzene, phloroglucin, gallic esters, phenol novolaks or cresol novolaks having an OH functionality of from 2.0 to 3.5 and also all isomers of the abovementioned compounds.

Exemplary diphenols and dicresols prepared by reacting phenols or cresols with diisopropylidenebenzene have a chemical structural formula which is shown below for cresol as an example:

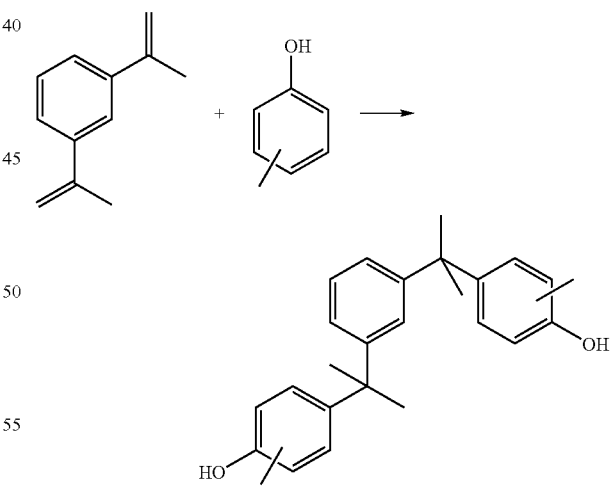

Particular preference is, for example, given to relatively nonvolatile bisphenols. Bisphenol A, bisphenol M, bisphenol S and 2,2'-diallylbisphenol A can be most preferred.

$Q_{PP}$ has, for example, two or three phenolic groups.

In a first exemplary embodiment, the polyurethane polymer PU1 can be prepared from at least one diisocyanate or triisocyanate and a polymer $Q_{PM}$ having terminal amino, thiol or hydroxyl groups. The polyurethane polymer PU1 can be prepared in a manner known to those skilled in the art of polyurethanes, for example by using the diisocyanate or triisocyanate in a stoichiometric excess relative to the amino, thiol or hydroxyl groups of the polymer $Q_{PM}$.

In a second exemplary embodiment, the polyurethane polymer PU1 can be prepared from at least one diisocyanate or triisocyanate and an optionally substituted polyphenol $Q_{PP}$. The polyurethane polymer PU1 can be prepared in a manner known to those skilled in the art of polyurethanes, for example by using the diisocyanate or triisocyanate in a stoichiometric excess relative to the phenolic groups of the polyphenol $Q_{PP}$.

In a third exemplary embodiment, the polyurethane polymer PU1 can be prepared from at least one diisocyanate or triisocyanate and a polymer $Q_{PM}$ having terminal amino, thiol or hydroxy groups and an optionally substituted polyphenol $Q_{PP}$. Various possibilities are available for preparing the polyurethane polymer PU1 from at least one diisocyanate or triisocyanate and a polymer $Q_{PM}$ having terminal amino, thiol or hydroxyl groups and/or an optionally substituted polyphenol $Q_{PP}$.

In a first exemplary method, referred to here as "one-pot process", a mixture of at least one polyphenol $Q_{PP}$ and at least one polymer $Q_{PM}$ can be reacted with at least one diisocyanate or triisocyanate in an excess of isocyanate.

In a second exemplary method, here referred to as "two-step process I", at least one polyphenol $Q_{PP}$ can be reacted with at least one diisocyanate or triisocyanate in an excess of isocyanate and subsequently reacted with at least one polymer $Q_{PM}$ in a substoichiometric amount.

In a third exemplary method, here referred to as "2-step process II", at least one polymer $Q_{PM}$ can be reacted with at least one diisocyanate or triisocyanate in an excess of isocyanate and subsequently with at least one polyphenol $Q_{PP}$ in a substoichiometric amount.

The three exemplary methods can lead to isocyanate-terminated polyurethane polymers PU1 which can have the same composition but differ in the sequence of their building blocks. All three methods are suitable, but the "2-step process II" is preferred.

If the isocyanate-terminated polyurethane polymers PU1 described are derived from bifunctional components, it has been found that the equivalence ratio of polymer $Q_{PM}$/polyphenol $Q_{PP}$ can be greater than, for example, 1.5 and the equivalence ratio of polyisocyanate/(polyphenol $Q_{PP}$+polymer $Q_{PM}$) can be greater than, for example, 1.2.

If an average functionality of the components used is greater than 2, the molecular weight can increase more rapidly than in the purely bifunctional case. It would be clear to those skilled in the art that the limits of the possible equivalence ratios can depend greatly on whether either the polymer $Q_{PM}$ selected, the polyphenol $Q_{PP}$, the polyisocyanate or a plurality of the components mentioned have a functionality of >2. Different equivalence ratios whose limits are determined by the viscosity of the resulting polymers and have to be determined experimentally from case to case can be set accordingly.

The polyurethane polymer PU1 can, for example, have elastic character and display a glass transition temperature Tg of 0° C.

The polyurethane polymer of the formula (I) can be prepared from a polyurethane polymer PU1 having the formula (III) and, if appropriate, the NCO-reactive compounds $R^2$—H and/or $R^3$—H.

$$R^1\!\!-\!\![\text{NCO}]_{(n1+n2+n3)} \quad\quad\quad\quad (III)$$

The radical $R^2$ is, for example, a group of the formula (II) and the radical $R^3$ is, for example, a group of the formula (II'). An exemplary polyurethane polymer of the formula (I) can be prepared by reacting a polyurethane polymer PU1 of the formula (III) with monohydroxyl epoxide compounds of the formula (IV) or the formula (IV').

The monohydroxyl epoxide compound of the formula (IV) or the formula (IV') can, for example, have 1, 2 or 3 epoxide groups. The hydroxyl group of this monohydroxyl epoxide compound of the formula (IV) or (IV') can be a primary or secondary hydroxyl group.

Such monohydroxyl epoxide compounds can be produced, for example, by reacting polyols with epichlorohydrin. Depending on the reaction conditions, the reaction of polyfunctional alcohols with epichlorohydrin also forms the corresponding monohydroxyl epoxide compounds as by-products in various concentrations. These can be isolated by known separation operations. It is, for example, sufficient to use the product mixture which is obtained in the glycidylization reaction of polyols and includes polyol which has been converted completely and partially into the glycidyl ether. Examples of such monohydroxyl epoxide compounds are butanediol monoglycidyl ether (present in butanediol diglycidyl ether), hexanediol monoglycidyl ether (present in hexanediol diglycidyl ether), cyclohexanedimethanol glycidyl ether, trimethylolpropane diglycidyl ether (present as a mixture in trimethylolpropane triglycidyl ether), glycerol diglycidyl ether (present as a mixture in glycerol triglycidyl ether), pentaerythritol triglycidyl ether (present as a mixture in pentaerythritol tetraglycidyl ether). Preference is given, for example, to using trimethylolpropane diglycidyl ether which is present in a relatively high proportion in known trimethylolpropane triglycidyl ether.

However, it is also possible to use other similar monohydroxyl epoxide compounds, in particular glycidol, 3-glycidyloxybenzyl alcohol or hydroxymethylcyclohexene oxide. Preference is, for example, also given to the β-hydroxy ether of the formula (V) which is present in an amount of about 15% (e.g., ±10%) in commercial liquid epoxy resins prepared from bisphenol A (R=CH₃) and epichlorohydrin, and also the corresponding β-hydroxy ethers of the formula (V) which are formed in the reaction of bisphenol F (R=H) or a mixture of bisphenol A and bisphenol F with epichlorohydrin.

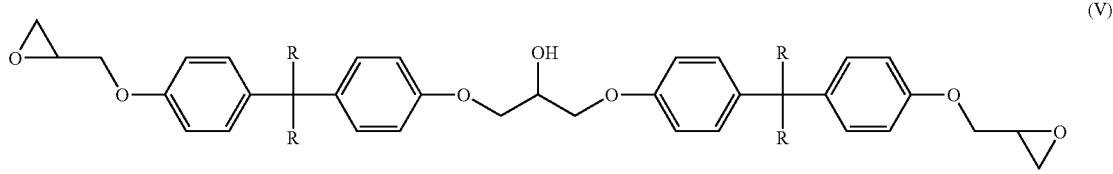

Preference is, for example, given to distillation residues which are obtained in the preparation of highly pure, distilled liquid epoxy resins. Such distillation residues can have a from one to three times higher concentration of hydroxyl-containing epoxides than commercial undistilled liquid epoxy resins. Furthermore, a variety of epoxides having a β-hydroxy ether group prepared by reaction of (poly)epoxides with a substoichiometric amount of monofunctional nucleophiles such as carboxylic acids, phenols, thiols or secondary amines can also be used.

The free primary or secondary OH function of the monohydroxyl epoxide compound of the formula (IV) or (IV') allows an efficient reaction with terminal isocyanate groups of polymers without disproportionate excesses of the epoxy component having to be used.

In conversion of the polyurethane polymers PU1 of the formula (III) into polyurethane polymers of the formula (I) in which n3=0, $R^2 \neq R^3$, it is possible to use $R^2H$ and $R^3H$ together or sequentially. The sequential reaction can have the exemplary advantage that the reaction can be controlled more easily so that the formation of symmetrical adducts is reduced. The compound used in the second step in a sequential reaction can, for example, advantageously be used in a stoichiometric excess in order to ensure that all NCO groups are reacted.

The proportion of the polyurethane polymer of the formula (I) is, for example, from 5 to 50% by weight, such as from 10 to 40% by weight, preferably from 15 to 35% by weight, based on the total weight of the foam.

The heat curing composition Z can additionally include at least one epoxy resin A which has an average of more than one epoxide group per molecule.

The epoxy resin A is, for example, a liquid epoxy resin or a solid epoxy resin. The term "solid epoxy resin" may be best-known to those skilled in the art of epoxides and is used in contrast to "liquid epoxy resin". The glass transition temperature Tg of solid resins is above room temperature (23±1° C.) (e.g., they can be comminuted at room temperature to give pourable powders).

Exemplary solid epoxy resins have the formula (VI):

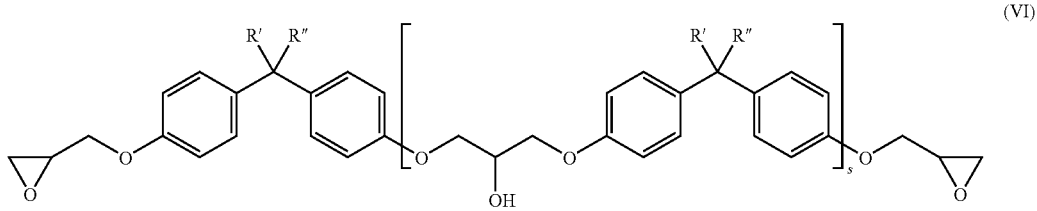

Here, the substituents R' and R" can each be, for example, independently of one another, either H or $CH_3$. Furthermore, the index s is, for example ≥1.5, such as from 2 to 12.

Such solid epoxy resins are commercially available from, for example, The Dow Chemical Company, USA, from Huntsman International, LLC, USA, or from Hexion Specialty Chemicals Inc., USA.

Compounds of the formula (VI) having an index s in an exemplary range from 1 to 1.5 are referred to as semisolid epoxy resins by those skilled in the art. For the purposes of the present disclosure, they are likewise considered to be solid resins. However, preference can, for example, be given to the solid epoxy resins in the narrower sense (e.g., where the index s is ≥1.5).

Exemplary liquid epoxy resins have the formula (VII):

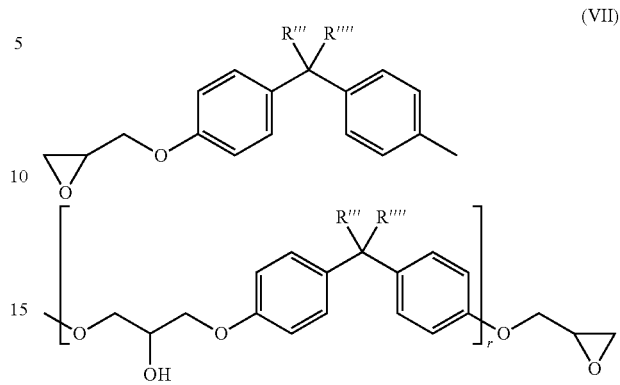

Here, the substituents R''' and R'''' can each be, for example, independently of one another, either H or $CH_3$. Furthermore, the index r is, for example, from 0 to 1. Exemplary liquid epoxy resins can have a value of r of ≤0.2.

The compounds are thus, for example, diglycidyl ethers of bisphenol A (DGEBA), of bisphenol F or of bisphenol A/F. The designation "A/F" refers to a mixture of acetone with formaldehyde which can be used as starting material in the preparation. Such liquid resins are commercially available, for example under the trade names Araldite GY 250, Araldite® PY 304, Araldite® GY 282 from Huntsman International, LLC, USA, or D.E.R.® 331 or D.E.R.® 330 from The Dow Chemical Company, USA, or under the trade name Epikote® 828 or Epikote® 862 from Hexion Specialty Chemicals Inc., USA.

The epoxy resin A is, for example, a liquid epoxy resin of the formula (VII). In a still more exemplary embodiment, the heat curing foam contains both at least one liquid epoxy resin of the formula (VII) and at least one solid epoxy resin of the formula (VI).

The proportion of epoxy resin A is, for example, from 2 to 80% by weight, such as from 5 to 70% by weight, preferably from 5.1 to 70% by weight, more preferably from 7 to 60% by weight, based on the total weight of the foam.

In a first exemplary embodiment, the composition Z of the heat curing foam as is described above has a polyurethane polymer of the formula (I) in which n3=0, the radical $R^2$ is a radical of the formula (II) and the radical $R^3$ is a radical of the formula (II'). Furthermore, the heat curing foam has at least one epoxy resin A in this first embodiment.

In a second exemplary embodiment, the composition Z of the heat curing foam has a polyurethane polymer of the formula (I) in which n1, n2 and n3≠0. Furthermore, heat curing foam has at least one epoxy resin A in this second embodiment.

It will be clear to those skilled in the art that isocyanate groups present in the composition Z can react with any hydroxyl groups present in the epoxy resin A. This reaction can, for example, be advantageous in particular cases and contribute to flexibilizing and increasing the impact toughness of the heat cured foam.

The gas present in the heat curing foam can be selected from the group comprising (e.g., consisting of) nitrogen ($N_2$), carbon dioxide ($CO_2$), hydrogen ($H_2$), carbon monoxide (CO), nitrous oxide ($N_2O$), a noble gas and any mixtures of these gases and also gas mixtures such as air. Nitrogen or air can, for example, be particularly suitable. Preference is, for example, given to air. The gas can be dried or undried. The gas is, for example, preferably dried.

The gas is enclosed in cells in the heat curing foam, which cells are uniformly distributed in the foam.

The composition Z may or may not additionally contain chemical or physical blowing agents. For the present purposes, chemical blowing agents are substances which form or eliminate gaseous substances under the action of heat, electromagnetic radiation or chemicals. Such substances are, for example, azodicarboxamides, sulfohydrazides, hydrogencarbonates or carbonates. As physical blowing agents, it is possible to use compounds which are converted into the gaseous state as a result of, for example, a change in the temperature, the pressure or the volume, such as when the temperature is increased or the pressure is reduced, and thus form a foam structure due to volume expansion. Such physical blowing agents are, for example, gases which are injected or mixed in the liquid or supercritical state into a composition under pressure, or liquids which vaporize at elevated temperature. Furthermore, gases or low-boiling liquids which are introduced in microencapsulated form into the composition can be used as physical blowing agents.

The proportion of the blowing agent can, for example, be advantageously from 0.1 to 3% by weight, based on the total weight of the foam.

If blowing agents which develop their action on heating are used for producing the heat curing foam, care should be taken to ensure that the foaming temperature is below the curing temperature of the heat curing foam since the foam would otherwise cure during the foaming process.

Blowing agents can be used in the composition Z or in the heat curing foam to, for example, effect after-foaming of the heat curing foam during the curing process. The composition Z and also the heat curing foam can, for example, be preferably free of chemical blowing agents.

The heat curing foam can also contain a thixotrope C based on a urea derivative. The urea derivative is, for example, a reaction product of an aromatic monomeric diisocyanate with an aliphatic amine compound. It is also possible to react a plurality of different monomeric diisocyanates with one or more aliphatic amine compounds or a monomeric diisocyanate with a plurality of aliphatic amine compounds. The reaction product of methylenedi(phenyl isocyanate) (MDI) with butylamine has been found to be particularly advantageous in exemplary embodiments.

The urea derivative can, for example, be present in a carrier material. The carrier material can be a plasticizer, such as a phthalate or an adipate, for example a diisodecyl phthalate (DIDP) or dioctyl adipate (DOA). The carrier can also be a non-diffusing carrier. This can be preferred to, for example, ensure very little migration of reacted constituents after curing. Blocked polyurethane polymers are, for example, preferred as a non-diffusing carrier.

The preparation of such urea derivatives and carrier materials is described in detail in the patent application EP 1 152 019 A1, the disclosure of which is hereby incorporated by reference in its entirety. The carrier material can, for example, be a blocked polyurethane polymer PU2, such as one obtained by reaction of a trifunctional polyether polyol with IPDI and subsequent blocking of the terminal isocyanate groups with $\epsilon$-caprolactam.

The total proportion of the thixotrope C can, for example, be from 0 to 40% by weight, such as from 5 to 25% by weight, based on the total weight of the foam. The weight ratio of urea derivative to the carrier which is optionally present can, for example, be in an exemplary range from 0.02:1 to 1:1, such as from 0.05:1 and 0.3:1.

The heat curing foam can also contain a liquid rubber D such as a carboxyl- or epoxide-terminated polymer.

In a further exemplary embodiment, this liquid rubber D can be a carboxyl- or epoxide-terminated acrylonitrile-butadiene copolymer or a derivative thereof. Such liquid rubbers are, for example, commercially available under the trade name Hycar® CTBN and CTBNX and ETBN from Emerald Performance Materials, LLC, USA. Suitable derivatives are, in particular, elastomer-modified polymers having epoxide groups, as are commercially available in the product line Polydis®, preferably the product line Polydis® 36, from Schill+Seilacher Gruppe, Germany, or in the product line Albipox® from Hanse Chemie AG, Germany.

In a further exemplary embodiment, this liquid rubber D can be a liquid polyacrylate rubber which is completely miscible with liquid epoxy resins and demixes to form microdroplets only during curing of the epoxy resin matrix. Such liquid polyacrylate rubbers can be obtained, for example, under the designation 20208-XPA from Rohm and Haas Co., USA.

It will be clear to those skilled in the art that it is also possible to use mixtures of liquid rubbers, such as mixtures of carboxyl- or epoxide-terminated acrylonitrile-butadiene copolymers or derivatives thereof with epoxide-terminated polyurethane polymers.

The liquid rubber D can be used in an amount of from, for example, 1 to 35% by weight, such as from 1 to 25% by weight, based on the total weight of the foam.

The heat curing foam can additionally contain a solid toughness improver E. Here and in the following, the term "toughness improver" refers to an additive to an epoxy resin matrix which even in small added amounts of from, for example, 0.1 to 15% by weight, such as from 0.5 to 8% by weight, based on the total weight of the foam, can effect a significant increase in the toughness and is thus able to absorb higher flexural, tensile, impact or shock stresses before the matrix tears or breaks.

The solid toughness improver E is, in a first exemplary embodiment, an organic ion-exchanged sheet mineral E1.

The ion-exchanged sheet mineral E1 can be either a cation-exchanged sheet mineral E1c or an anion-exchanged sheet mineral E1a.

The cation-exchanged sheet mineral E1c can be obtained from a sheet mineral E1' in which at least part of the cations have been replaced by organic cations. Examples of such cation-exchanged sheet minerals E1c are those mentioned in U.S. Pat. No. 5,707,439 or U.S. Pat. No. 6,197,849, the disclosures of which are hereby incorporated by reference in their entireties. The process for producing these cation-exchanged sheet minerals E1c is likewise described there. The sheet mineral E1' is, for example, a sheet silicate. The sheet mineral E1' can preferably be a phyllosilicate as described in U.S. Pat. No. 6,197,849, column 2, line 38 to column 3, line 5, in particular a bentonite. Sheet minerals E1' such as caolinite or a montmorillonite or a hectorite or an illite have also been found to be particularly suitable.

At least part of the cations of the sheet mineral E1' can be replaced by organic cations. Examples of such cations are n-octylammonium, trimethyldodecylammonium, dimethyldodecylammonium or bis(hydroxyethyl)octadecyl-ammonium or similar derivatives of amines which can be obtained from natural fats and oils; or guanidinium cations or amidinium cations; or cations of N-substituted derivatives of pyrrolidine, piperidine, piperazine, morpholine, thiomorpholine; or cations of 1,4-diazobicyclo[2.2.2]octane (DABCO) and 1-azo-bicyclo[2.2.2]octane; or cations of N-substituted derivatives of pyridine, pyrrole, imidazole, oxazole, pyrimidine, quinoline, isoquinoline, pyrazine, indole, benzimidazole, benzoxazole, thiazole, phenazine and 2,2'-bipyridine. Cyclic amidinium cations, in particular those disclosed in U.S. Pat. No. 6,197,849 in column 3, line 6 to column 4, line 67, are also suitable. Cyclic ammonium compounds have an increased thermal stability compared to linear ammonium compounds.

Exemplary cation-exchanged sheet minerals E1c are known to those skilled in the art under the term organoclay or nanoclay and are commercially available, for example, under the group name Tixogel® or Nanofil® (Sadchemie AG, Germany) Cloisite® (Southern Clay Products, Inc. USA) or Nanomer® (Nanocor, Inc., USA).

The anion-exchanged sheet mineral E1a can be obtained from a sheet mineral E1" in which at least part of the anions have been replaced by organic anions. An example of such an anion-exchange sheet mineral E1a is a hydrotalcite E1" in which at least part of the carbonate anions of the intermediate layers have been replaced by organic anions. A further example is functionalized aluminoxanes as described, for example, in U.S. Pat. No. 6,322,890, the disclosure of which is hereby incorporated by reference in its entirety.

It is also possible for a cation-exchanged sheet mineral E1c and an anion-exchanged sheet mineral E1a to be simultaneously present in the composition.

The solid toughness improver can, in a second exemplary embodiment, be a block copolymer E2. The block copolymer E2 can be, for example, obtained from an anionic or controlled free-radical polymerization of methacrylic esters with at least one further monomer having an olefinic double bond. As monomers having an olefinic double bond, preference can, for example, be given to those in which the double bond is directly conjugated with a heteroatom or with at least one further double bond. Suitable monomers are, for example, monomers selected from the group comprising (e.g., consisting of) styrene, butadiene, acrylonitrile and vinyl acetate. Preference can be given to acrylate-styrene-acrylic acid (ASA) copolymers obtainable, for example, under the name GELOY® 1020 from GE Plastics Co., USA.

Exemplary block copolymers E2 are block copolymers composed of methyl methacrylate, styrene and butadiene. Such block copolymers can be obtained, for example, as triblock copolymers under the group designation SBM from Arkema, Inc. USA.

The solid toughness improver E can, in a third exemplary embodiment, be a core-shell polymer E3. Core-shell polymers include (e.g., consist of) an elastic core polymer (core) and a rigid shell polymer (shell). Exemplary core-shell polymers include a core composed of elastic acrylate or butadiene polymer surrounded by a rigid shell of a rigid thermoplastic polymer. This core-shell structure is either formed spontaneously by demixing of a block copolymer or results from the polymerization as a latex or suspension polymerization with subsequent grafting. Exemplary core-shell polymers are MBS polymers which are commercially available under the trade name Clearstrength® from Arkema, Inc., USA, Paraloid® from Rohm and Haas Co., USA, or F-351™ from Zeon Chemicals L.P., USA.

Particular preference is, for example, given to core-shell polymer particles which are present as dried polymer latex. Examples are GENIOPERL® M23A from Wacker Chemie AG, Germany, having a polysiloxane core and an acrylate shell, radiation-crosslinked rubber particles of the NEP series produced by Eliokem, Inc., USA, or Nanopren® from Lanxess AG, Germany, or Paraloid® EXL from Rohm and Haas Co., USA.

Further comparable examples of core-shell polymers are offered under the trade name Albidur® from Nanoresins AG, Germany.

The solid toughness improver E can, in a fourth exemplary embodiment, be a solid reaction product E4 of a carboxylated solid nitrile rubber with excess epoxy resin.

In a fifth exemplary embodiment, the solid toughness improver E can be an amorphous silicon dioxide as described, for example, in WO 02/083776 A1 and WO 2004/081076, whose disclosures are hereby incorporated by reference in their entireties. Such products are commercially available under the trade name Albipox® from Nanoresins AG, Germany.

Core-shell polymers can be used as the solid toughness improver E.

The solid core-shell polymer E3 can be present in the heat curing foam in an amount of, for example, from 0.1 to 15% by weight, such as from 1 to 8% by weight, based on the total weight of the foam.

In a further exemplary embodiment, the composition additionally can contain at least one filler F. This is, for example, mica, talc, kaolin, wollastonite, feldspar, syenite, chlorite, bentonite, montmorillonite, calcium carbonate (precipitated or milled), dolomite, quartz, silicas (pyrogenic or precipitated), cristobalite, calcium oxide, aluminum hydroxide, magnesium oxide, hollow ceramic spheres, hollow glass spheres, hollow organic spheres, glass spheres, color pigments. The term filler F can be used to refer both to the organically coated and the uncoated commercially available forms which are known to those skilled in the art.

The proportion of filler F is, for example, from 3 to 50% by weight, such as from 3 to 35% by weight, in particular from, for example, 5 to 25% by weight, based on the total weight of the foam.

In a further exemplary embodiment, the composition additionally can contain at least one reactive diluent G having epoxide groups. Exemplary reactive diluents G are:

glycidyl ethers of monofunctional saturated or unsaturated, branched or unbranched, cyclic or open-chain $C_4$-$C_{30}$-alcohols, e.g. butanol glycidyl ether, hexanol glycidyl ether, 2-ethylhexanol glycidyl ether, allyl glycidyl ether, tetrahydrofurfuryl glycidyl ether and furfuryl glycidyl ether, trimethoxysilyl glycidyl ether, etc.

glycidyl ethers of bifunctional saturated or unsaturated, branched or unbranched, cyclic or open-chain $C_2$-$C_{30}$-alcohols, e.g. ethylene glycol glycidyl ether, butanediol glycidyl ether, hexanediol glycidyl ether, octanediol glycidyl ether, cyclohexanedimethanol diglycidyl ether, neopentyl glycol diglycidyl ether, etc.

glycidyl ethers of trifunctional or polyfunctional, saturated or unsaturated, branched or unbranched, cyclic or open-chain alcohols, e.g. epoxidized castor oil, epoxidized trimethylolpropane, epoxidized pentaerythritol or polyglycidyl ethers of aliphatic polyols such as sorbitol, glycerol, trimethylolpropane, etc.

glycidyl ethers of phenol and aniline compounds, e.g. phenyl glycidyl ether, cresyl glycidyl ether, p-tert-butylphenyl glycidyl ether, nonylphenol glycidyl ether, 3-n-pentadecenyl glycidyl ether (from cashew nut shell oil), N,N-diglycidylaniline, etc.

epoxidized amines such as N,N-diglycidylcyclo-hexylamine, etc.

epoxidized monocarboxylic or dicarboxylic acids, e.g. glycidyl neodecanoate, glycidyl methacrylate, glycidyl benzoate, diglycidyl phthalate, tetrahydrophthalate and hexahydrophthalate, diglycidyl esters of dimeric fatty acids, etc.

epoxidized bifunctional or trifunctional, low molecular weight to high molecular weight polyether polyols, e.g. polyethylene glycol diglycidyl ether, polypropylene glycol diglycidyl ether, etc.

Preference is given, for example, to hexanediol diglycidyl ether, cresyl glycidyl ether, p-tert-butylphenyl glycidyl ether, polypropylene glycol diglycidyl ether and polyethylene glycol diglycidyl ether.

The proportion of the reactive diluent G having epoxide groups can, for example, be from 0.5 to 20% by weight, such as from 1 to 8% by weight, based on the total weight of the foam.

The composition can include further exemplary constituents, such as catalysts, heat stabilizers and/or light stabilizers, thixotropes, plasticizers, solvents, mineral or organic fillers, blowing agents, dyes and pigments.

The present disclosure further encompasses exemplary processes for producing a heat curing foam.

A first, exemplary process for producing a heat curing foam includes introducing the gas at temperatures of from, for example, 20 to 80° C., such as from 20 to 60° C., and atmospheric pressure into a heat curing composition Z and mixing it into and distributing it in the composition by means of a mixing apparatus. The introduction of the gas can, in this process, be carried out by, for example, blowing the gas via a superatmospheric pressure line into the composition or by sucking it into the composition by means of reduced pressure in a mixing apparatus.

Such process is described, for example, in DE 10 2005 042 380 A1, the disclosure of which is hereby incorporated by reference in its entirety.

A second exemplary process for producing a heat curing foam includes injecting a gas which is present in the liquid or supercritical state into a heat curing composition Z which is under pressure and mixing it into and distributing it in the composition by means of a mixing apparatus. In subsequent depressurization of the composition to atmospheric pressure, the gas can expand and a foam is formed.

In both processes for producing the heat curing foam, the composition Z can be foamed before application (e.g., the foaming process can largely be concluded at the point in time of application). In this way, it be ensured that the composition can be applied precisely and that no movement of the substrates to be adhesively bonded takes place as a result of the foaming process during curing under the action of heat when the heat curing foam is used as adhesive.

Because the composition to be foamed is a heat curing composition Z, it should be ensured that foaming is, regardless of the process by which it is carried out, carried out at temperatures which are, for example, below the curing temperature of the composition. The foaming temperature is for example ≤100° C., such as from 20 to 80° C., more preferably from, for example, 20 to 60° C.

Both the heat curing composition Z and the heat curing foam obtainable therefrom should be storage stable at temperatures of, for example, ≤100° C., such as at room temperature (e.g., they can be stored for a period of several months up to one year and longer in a suitable packaging or arrangement, for example a drum, a bag or a cartridge, without changing, as a result of chemical reactions, their use properties or their properties after curing to an extent relevant for their use).

Furthermore, the present disclosure encompasses the use of a heat curing foam as described above as, for example, adhesive, sealant or for producing coatings and also for filling hollow structures with foam. Here, the heat curing foam can be used as a one-component or multicomponent system for a wide range of possible uses.

For example, the heat curing foam of the disclosure is suitable as heat curing adhesive for structural adhesive bonds or for interfacing in vehicle construction.

Such adhesives are desired for adhesive bonding and interfacing of heat-stable materials.

For the purposes of the present disclosure, heat-stable materials are, for example, materials which are dimensionally stable at least during the curing time at a curing temperature of from, for example, 100 to 220° C., such as from 120 to 200° C. They include metals and plastics such as ABS (=acrylonitrile-butadiene-styrene), polyamide, polyphenylene ether, composite materials such as SMC (=sheet molding compound), unsaturated polyesters GRP (=glass-reinforced plastics), epoxide or acrylate composites. Preference is given to the use in which at least one material is a metal. An exemplary use is the adhesive bonding of identical or different metals, such as in body construction in the automobile industry. The exemplary metals are first and foremost steel, such as electrolytically zinc-plated, hot zinc-plated, oiled steel, Bonazinc-coated steel and after-phosphated steel and also aluminum, such as in the variants which occur in automobile construction.

The heat curing foam can be used as a heat curing sealant, such as for sealing folded joints and seams.

A heat curing foam based on a composition Z according to the disclosure makes it possible to make the technology of crash-resistant structural adhesives available for interfacing and seals and thus to achieve optimal adhesion results here, too.

Furthermore, it is possible to vary the strength of the resulting heat cured foam via different degrees of foaming. In this way, heat curing foams made from the same heat curing composition Z but having different proportions of gas can be used for different purposes. It is also possible to alter the degree of foaming very quickly during application by use of a suitable foaming and mixing plant which is used directly before the application plant for the heat curing foam.

An adhesive, sealant or coating based on a heat curing foam according to the disclosure makes it possible to achieve the desired combination of high strength with a significantly lower usage of material.

Furthermore, the present disclosure encompasses a process for adhesively bonding substrates S1 and S2, which includes:
 c1) application of a heat curing foam as per the above description to a substrate S1;
 c2) contacting of the applied composition with a second substrate S2;
or
 d1) application of a heat curing foam as per the above description to the substrates S1 and S2;
 d2) joining of the two substrates S1 and S2 with applied foam.

The substrate S1 can comprise (e.g., consists of) an identical or different heat-stable material as the substrate S2.

The present disclosure also encompasses a process for sealing a substrate S1 and/or S2, which includes:
- e1) application of a heat curing foam as per the above description to a substrate S1 and/or a substrate S2; or
- f1) application of a heat curing foam as per the above description between the surfaces of the substrates S1 and S2.

The substrate S1 can comprise (e.g. consists of) an identical or different heat-stable material as the substrate S2.

The present disclosure further encompasses a process for filling hollow structures with foam, which includes:
- g1) injection of a heat curing foam into an existing hollow structure.

Here, the heat cured foam can be used as seal and/or for acoustic insulation and/or for structural reinforcement of the hollow structure, for example a structural component.

The present disclosure likewise encompasses a process for producing a coating or for sealing a substrate S1, which include:
- h1) application of a heat curing foam as per the above description to a substrate S1.

The steps c2) and d2) of adhesive bonding and also the steps e1) and f1) of sealing, step g1) of filling hollow structures with foam and step h1) of coating can be followed by one or more curing steps at temperatures of from, for example, 100 to 220° C., such as at temperatures of from 120 to 200° C.

A further aspect of the disclosure is that the degree of foaming of the composition Z and thus the gas content of the heat curing foam of the disclosure can be varied during application of the foam in the above-described exemplary processes. A suitable foaming and application plant can be controlled by a computer by means of suitable software in order to set the degree of foaming. By varying the degree of foaming during application, foams having different properties can be applied from the same application apparatus, for example without setting-down.

FIG. 1 schematically shows an exemplary process for the production, application and curing of a heat curing foam according to the disclosure. Such a process is employed, for example, for adhesively bonding two substrates on a production line. The composition Z 1 is conveyed together with a gas from a gas container 2 into a mixing apparatus M where the composition Z 1 and the gas are mixed with one another. The resulting heat curing foam 3 is, for example, applied directly from the mixing apparatus M by means of the application apparatus or by hand to a substrate 4. The substrate 4 can be subsequently joined to a second substrate 4' via the heat cooling foam. The joined part is then heated to the curing temperature of the heat curing foam, resulting in the heat curing foam 3 curing to give a heat cured foam 3'.

An exemplary advantage of such a process in which the steps of production and application of the foam take place in direct succession is that the gas content of the heat curing foam can be varied very quickly. Thus, it is possible to produce heat curing foams which, owing to their different gas content, have different properties from the same composition Z. Application of these heat curing foams can be carried out by means of such a process without setting down the application apparatus on one piece.

Figure 2:
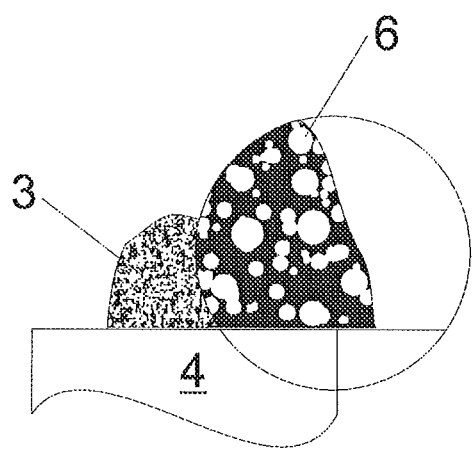
FIG. 2 schematically shows a cross section through a bead of a heat curing foam 3 along the line A-A in FIG. 1.

FIG. 2 schematically shows a bead of an exemplary heat curing foam 3 on a substrate 4, with a section (in the circle) being shown enlarged. The gas is located in cells or pores 6 which are uniformly distributed in the composition Z.

Figure 3:
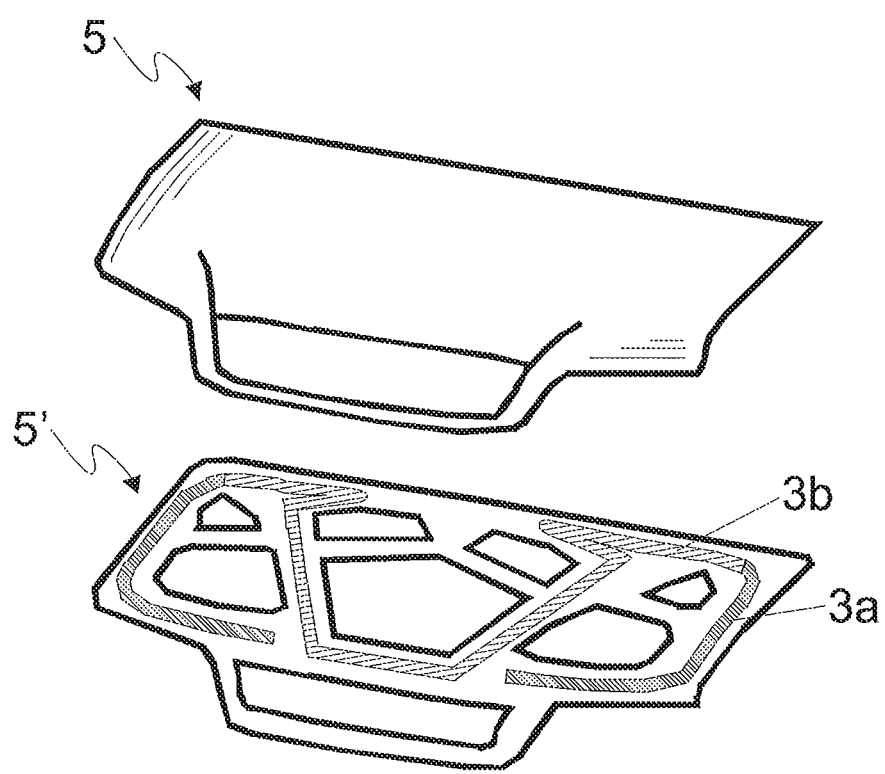
FIG. 3 schematically shows an exemplary hood of an automobile, having a steel sheet 5 and a steel framework 5' located underneath, before adhesive bonding.

FIG. 3 schematically shows an exemplary hood of an automobile, having an outer metal sheet 5 and a rib-like inner metal sheet 5' located underneath the former for stiffening, before adhesive bonding. A heat curing foam is applied as adhesive from an application apparatus to the steel framework 5' without the application apparatus being set down. Depending on the position of adhesive bonding, a foam having a different gas content can be applied. At those places which involve a particularly high strength and have to withstand large mechanical stresses, a heat curing foam 3a having a low gas content (e.g., a gas content of from, for example, 10 to 50% by volume, can be applied). At places where the heat curing foam is to have only limited structural properties, for example in the interior region of the hood where the heat curing foam can be applied as purely interfacing adhesive, a heat curing foam 3b having a high gas content (e.g., a gas content of from, for example, 30 to 80% by volume) can be used. Changing the mixing ratio of the composition Z and the gas during the production and application process makes it possible, for example, to apply heat curing foams having a low gas content 3a and foams having a high gas content 3b from the same apparatus on the piece without setting down.

Furthermore, the disclosure encompasses a heat cured foam which can be obtained by curing a heat curing foam as described above.

The gas in the heat cured foam can, for example, be enclosed in pores which have an exemplary diameter of $\leq 1$ mm, such as $\leq 0.5$ mm, preferably $\leq 0.1$ mm, and are homogeneously distributed in the composition.

Furthermore, the present disclosure encompasses an article resulting from such a process for adhesive bonding, sealing or coating. Such an article can, for example, be a vehicle or an add-on part of a vehicle, such as an automobile.

In addition, the heat curing foam of the disclosure is suitable not only for automobile construction but also for other fields of use. Particular mention may be made of related applications in the construction of, for example, transport means such as ships, goods vehicles, buses or rail vehicles or in the construction of consumer goods such as washing machines.

EXAMPLES

Production of a Heat Curing Foam 300 g of the adhesive SikaPower® 419E1, which is commercially available from Sika Automotive GmbH, Germany, were weighed into a metal can stirred in a high-speed stirrer having a stirring speed of 2500 revolutions per minute and a disk diameter of 8 cm for 7 minutes with up and down movement of the can. At the same time, compressed air was blown into the adhesive at a pressure of 3 bar via a pressure line. While the mass remained constant, the density was reduced from 1.28 kg/m$^3$ to 1.14 kg/m$^3$, corresponding to a volume increase of about 12%. Thus, a heat curing foam having an air content of 12% by volume was produced.

Experiments

The heat curing foam produced as described above was applied manually by means of a spatula to a zinc-plated steel sheet as is customarily used in automobile construction. As reference example, the unfoamed adhesive was applied in the same way directly alongside. The test specimen was subsequently cured in an oven at 175° C. for 35 minutes.

An adhesively bonded composite was produced analogously from two zinc-plated steel sheets and the heat curing foam described or the unfoamed adhesive, which was cured at 175° C. for 35 minutes in an oven after joining.

Results

An exemplary foam according to the disclosure displayed very good adhesion to the substrate. Furthermore, cutting open the heat cured foam revealed that the air-filled pores of the foam are very uniformly distributed in the foam.

The two exemplary adhesively bonded composites as produced displayed very good adhesion in the wedge test.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE NUMERALS

1 composition Z
2 gas container
3 heat curing foam
3a heat curing foam having a low gas content
3b heat curing foam having a high gas content
3' heat cured foam
4 part to be joined/substrate S1
4' part to be joined/substrate S2
5 hood/outer metal sheet
5' hood/inner metal sheet
6 cells/pores

What is claimed is:

1. A heat curing foam, comprising:
   a) from 10 to 80% by volume of at least one gas; and
   b) a heat curing composition Z containing:
      b1) at least one polyurethane polymer of formula (I) in an amount of 10 to 35% by weight, based on a total weight of the foam:

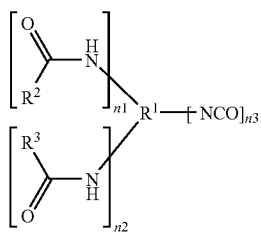

(I)

where
   $R^1$ is a polyurethane polymer PU1 terminated by n1+n2+n3 isocyanate groups after removal of all terminal isocyanate groups;
   each radical $R^2$, independently of other $R^2$ radicals, is at least one of a blocking group which is eliminated at a temperature above 100° C., and a group of formula (II):

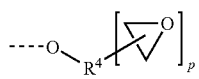

(II)

each radical $R^3$, independently of other $R^3$ radicals, is at least one of a blocking group which is eliminated at a temperature above 100° C., and a group of formula (II'):

(II')

where each $R^4$ and $R^{4'}$ are at least one of an aliphatic, a cycloaliphatic, an aromatic, and an arylaliphatic (p+1), respectively (f+1)-valent hydrocarbon radical, where:
   p=1, 2 or 3 and f=1, 2 or 3;
   n1 and n2 are each in a range from 0 to 7, n3 is 0, with 2≤(n1+n2+n3)≤8, provided that at least one of n1 and n2 is not 0; and b2) at least one hardener B which is activated by elevated temperature, wherein the heat curing composition Z further comprises: at least one liquid epoxy resin A which has formula (VII):

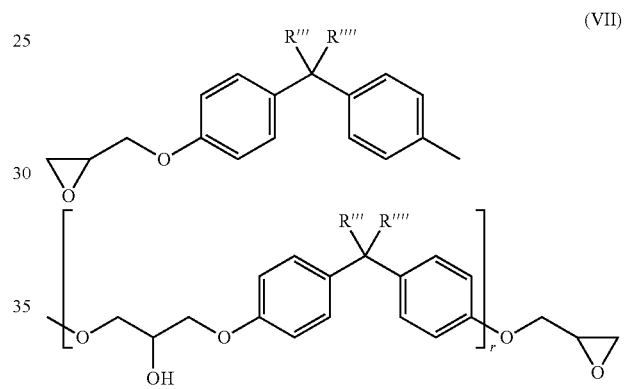

(VII)

wherein R''' and R'''' are each, independently of one another, H or $CH_3$, and r is from 0 to 1.

2. The heat curing foam as claimed in claim 1, wherein the heat curing composition Z is free of chemical blowing agents.

3. The heat curing foam as claimed in claim 1, wherein the gas is enclosed in cells which are homogeneously distributed in the foam.

4. The heat curing foam as claimed in claim 1, wherein at least one of an $R^2$ and $R^3$ in the blocked polyurethane polymer of the formula (I) is a radical selected from the group consisting of:

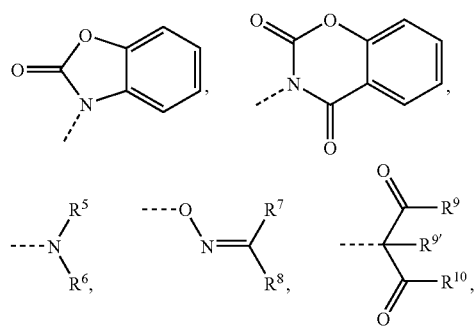

-continued

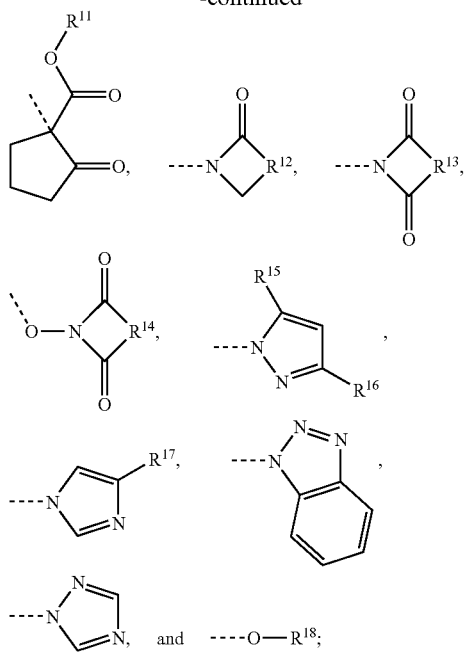

where
- $R^5$, $R^6$, $R^7$ and $R^8$ are each, independently of any other $R^5$, $R^6$, $R^7$ and $R^8$, at least one of an alkyl group, a cycloalkyl group, an aryl group, an arylalkyl group, an alkylaryl group; or at least one of $R^5$ together with $R^6$, and $R^7$ together with $R^8$, form part of a substituted 4- to 7-membered ring;
- $R^9$, $R^{9'}$ and $R^{10}$ are each, independently of any other $R^9$, $R^{9'}$ and $R^{10}$, at least one of an alkyl group, an aryl group, an arylalkyl group, an alkylaryl group, an alkoxy group, an aryloxy group and an arylalkyloxy group; $R^{11}$ is an alkyl group;
- $R^{12}$, $R^{13}$ and $R^{14}$ are each, independently of any other $R^{12}$, $R^{13}$ and $R^{14}$, at least one of an alkylene group having from 2 to 5 carbon atoms, a phenylene group, and a hydrogenated phenylene group;
- $R^{15}$, $R^{16}$ and $R^{17}$ are each, independently of any other $R^{15}$, $R^{16}$ and $R^{17}$, at least one of H, an alkyl group, an aryl group and an arylalkyl group; and
- $R^{18}$ is at least one of an arylalkyl group or a monocyclic or polycyclic substituted or unsubstituted aromatic group.

5. The heat curing foam as claimed in claim 1, wherein the polyurethane polymer PU1 is prepared from at least one polyisocyanate and at least one polymer Q having at least one of a terminal amino group, a thiol group and a hydroxyl group and/or a substituted or unsubstituted phenol.

6. The heat curing foam as claimed in claim 1, wherein $R^2$ is a radical of the formula (II); and $R^3$ is a radical of the formula (II').

7. The heat curing foam as claimed in claim 1, wherein a proportion of the epoxy resin A is from 2 to 80% by weight, based on the total weight of the foam.

8. The heat curing foam as claimed in claim 1, wherein a proportion of the polyurethane polymer of the formula (I) is from 15 to 35% by weight, based on the total weight of the foam.

9. The heat curing foam as claimed in claim 1, wherein a proportion of the hardener B is from 0.5 to 8% by weight, based on the total weight of the foam.

10. The heat curing foam as claimed in claim 1, wherein the hardener B is a catalyst with a proportion from 0.05 to 2% by weight, based on the total weight of the foam.

11. The heat curing foam as claimed in claim 1, wherein the gas is selected from the group consisting of nitrogen ($N_2$), carbon dioxide ($CO_2$), hydrogen ($H_2$), carbon monoxide (CO), nitrous oxide ($N_2O$), a noble gas, any mixtures of these gases, air and air mixtures.

12. The heat curing foam as claimed in claim 1, wherein the foam comprises:
at least one filler, in an amount of from 1 to 50% by weight, based on the total weight of the foam.

13. The heat curing foam of claim 1, further comprising:
a substrate.

14. The heat curing foam of claim 1, wherein the polyurethane polymer of formula (I) is obtained by reaction of isophorone diisocyanate (IPDI) and a polymer $Q_{PM}$ having thiol, amine or hydroxyl groups.

15. The heat curing foam of claim 1, wherein the polyurethane polymer of formula (I) is obtained by reaction of a polyisocyanate and a polyol, wherein the polyol comprises a polyoxyalkylene polyol, a polyhydrocarbon polyol or a mixture thereof, wherein the polyoxyalkylene polyol is a polymerization product of tetrahydrofuran, and the polyhydrocarbon polyol is a hydroxyl-terminated polybutadiene.

16. The heat curing foam of claim 1, further comprising silica in an amount of 3 to 35% by weight, based on the total weight of the foam.

17. The heat curing foam of claim 1, further comprising a reactive diluent in an amount of 1 to 8% by weight, based on the total weight of the foam.

18. A process for producing a heat curing foam, comprising:
forming
a heat curing composition Z containing:
b1) at least one polyurethane polymer of formula (I) in an amount of 10 to 35% by weight, based on a total weight of the foam:

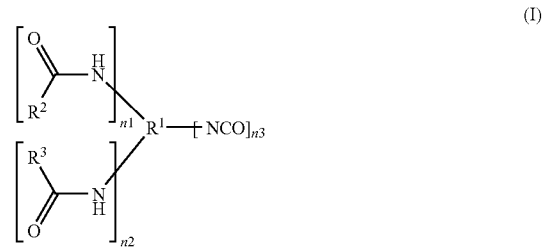

where
- $R^1$ is a polyurethane polymer PU1 terminated by n1+n2+n3 isocyanate groups after removal of all terminal isocyanate groups;
- each radical $R^2$, independently of other $R^2$ radicals, is at least one of a blocking group which is eliminated at a temperature above 100° C., and a group of formula (II):

each radical $R^3$, independently of other $R^3$ radicals, is at least one of a blocking group which is eliminated at a temperature above 100° C., and a group of formula (II'):

where each $R^4$ and $R^{4'}$ are at least one of an aliphatic, a cycloaliphatic, an aromatic, and an arylaliphatic (p+1), respectively (f+1)-valent hydrocarbon radical, where:
p=1, 2 or 3 and f=1, 2 or 3;
n1 and n2 are each in a range from 0 to 7, n3 is 0, with $2 \leq (n1+n2+n3) \leq 8$, provided that at least one of n1 and n2 is not 0; and
b2) at least one hardener B which is activated by elevated temperature;
introducing from 10 to 80% by volume of at least one gas into the heat curing composition Z at least at atmospheric pressure; and
distributing the gas in the composition by a mixing apparatus,
wherein the heat curing composition Z further comprises: at least one liquid epoxy resin A which has formula (VII):

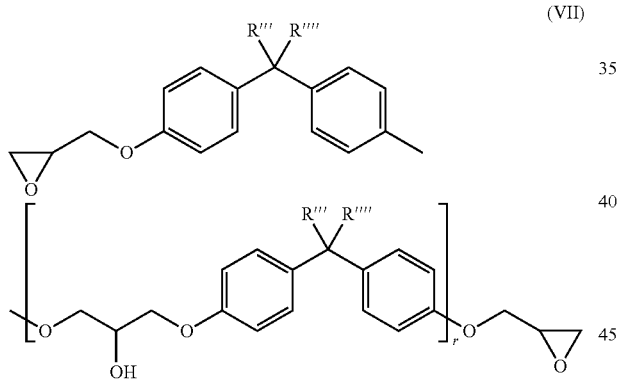

wherein R''' and R'''' are each, independently of one another, H or $CH_3$, and r is from 0 to 1.

19. The process of claim 18, further comprising:
applying the heat curing foam as at least one of an adhesive, a sealant, a coating, and a foam filler of a hollow structure.

20. The process of claim 18, further comprising:
applying the heat curing foam as heat curing adhesive for at least one of a structural adhesive bond and an interface in vehicle construction.

21. The process of claim 18, further comprising:
applying the heat curing foam as heat curing sealant for sealing folded joints and seams.

22. The process of claim 18, further comprising:
c1) applying the heat curing foam to a substrate S1; and
c2) contacting the applied heat curing foam with a second substrate S2;
where the substrates S1 and S2 contain a heat-stable material; and curing the heat curing foam on S1 and S2 at a temperatures of from 100 to 220° C.

23. The process as claimed in claim 22, further comprising:
varying a degree of foaming of the composition Z and gas content of the heat curing foam during application of the foam.

24. The process of claim 22, further comprising:
applying the heat curing foam to each of the substrates S1 and S2 before joining the two substrates S1 and S2.

25. The process as claimed in claim 18, further comprising at least one of:
applying the heat curing foam to at least one of a substrate S1 and a substrate S2; and
applying the heat curing foam between surfaces of the substrates S1 and S2;
where the substrates S1 and S2 contain a heat-stable material.

26. The process as claimed in claim 18, further comprising:
injecting the heat curing foam into an existing hollow structure; and
curing the heat curing foam at a temperatures of from 100 to 220° C.

27. The process as claimed in claim 18, further comprising:
applying the heat curing foam to a substrate S1; and
curing the heat curing foam at a temperatures of from 100 to 220° C.

28. The process of claim 18, wherein the gas is at a temperatures of from 20 to 80° C., and the pressure is atmospheric pressure.

29. The process of claim 28, wherein the gas is at a temperatures from 20 to 60° C.

30. The process of claim 18, wherein the introducing comprises:
injecting the gas which is present in a liquid or supercritical state into the heat curing composition Z which is under a superatmospheric pressure that is distributed in the composition by the mixing apparatus for expansion on subsequent depressurization of the composition to form the foam.

31. A heat cured foam obtained from a heat curing foam, the heat curing foam comprising:
a) from 10 to 80% by volume of at least one gas; and
b) a heat curing composition Z containing:
b1) at least one polyurethane polymer of formula (I) in an amount of 10 to 35% by weight, based on a total weight of the foam:

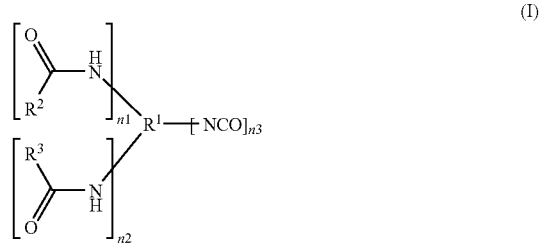

where
$R^1$ is a polyurethane polymer PU1 terminated by n1+n2+n3 isocyanate groups after removal of all terminal isocyanate groups;
each radical $R^2$, independently of other $R^2$ radicals, is at least one of a blocking group which is eliminated at a temperature above 100° C., and a group of formula (II):

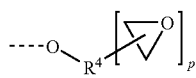
(II)

each radical $R^3$, independently of other $R^3$ radicals, is at least one of a blocking group which is eliminated at a temperature above 100° C., and a group of formula (II'):

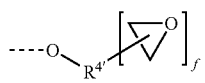
(II')

where each $R^4$ and $R^{4'}$ are at least one of an aliphatic, a cycloaliphatic, an aromatic, and an arylaliphatic, respectively (f+1)-valent hydrocarbon radical, where:

p=1, 2 or 3 and f=1, 2 or 3;

n1 and n2 are each in a range from 0 to 7, n3 is 0, with 2≤(n1+n2+n3)≤8, provided that at least one of n1 and n2 is not 0; and b2) at least one hardener B which is activated by elevated temperature, wherein the heat curing composition Z further comprises: at least one liquid epoxy resin A which has formula (VII):

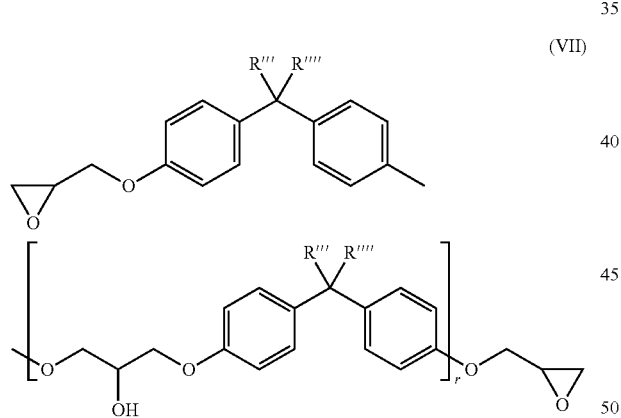
(VII)

wherein R''' and R'''' are each, independently of one another, H or CH$_3$, and r is from 0 to 1.

32. The heat cured foam as claimed in claim 31, wherein the gas is enclosed in pores which have a diameter of ≤1 mm, and are homogeneously distributed in the composition.

33. An article which has been at least one of adhesively bonded, sealed, filled with foam and coated by a process, the process comprising:

forming a heat curing composition Z containing:

b1) at least one polyurethane polymer of formula (I) in an amount of 10 to 35% by weight, based on a total weight of the foam:

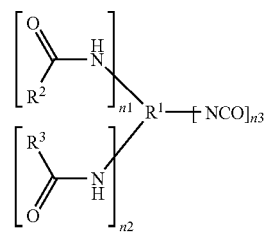
(I)

where $R^1$ is a polyurethane polymer PU1 terminated by n1+n2+n3 isocyanate groups after removal of all terminal isocyanate groups;

each radical $R^2$, independently of other $R^2$ radicals, is at least one of a blocking group which is eliminated at a temperature above 100° C., and a group of formula (II):

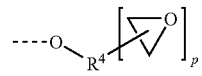
(II)

each radical $R^3$, independently of other $R^3$ radicals, is at least one of a blocking group which is eliminated at a temperature above 100° C., and a group of formula (II'):

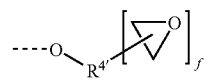
(II')

where each $R^4$ and $R^{4'}$ are at least one of an aliphatic, a cycloaliphatic, an aromatic, and an arylaliphatic (p+1), respectively (f+1)-valent hydrocarbon radical, where:

p=1, 2 or 3 and f=1, 2 or 3;

n1 and n2 are each in a range from 0 to 7, n3 is 0, with 2≤(n1+n2+n3)≤8, provided that at least one of n1 and n2 is not 0; and b2) at least one hardener B which is activated by elevated temperature;

introducing from 10 to 80% by volume of at least one gas into the heat curing composition Z at least at atmospheric pressure; and distributing the gas in the composition by a mixing apparatus, wherein the heat curing composition Z further comprises: at least one liquid epoxy resin A which has formula (VII):

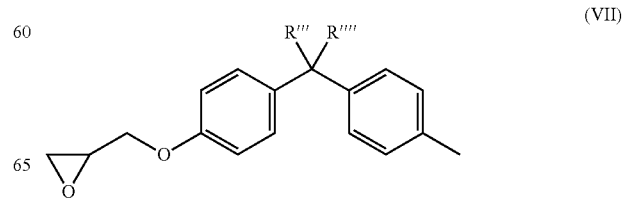
(VII)

-continued
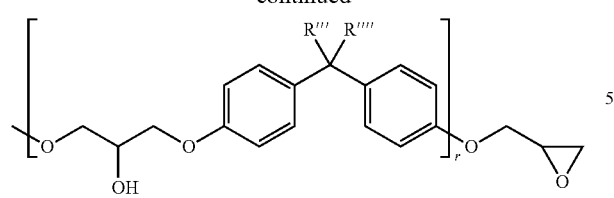
wherein R''' and R'''' are each, independently of one another, H or CH$_3$, and r is from 0 to 1.
34. The article as claimed in claim 33, wherein the article is at least one of a vehicle, a means of transport, and a consumer article.
* * * * *